(12) United States Patent
Stengel

(10) Patent No.: US 6,872,261 B2
(45) Date of Patent: Mar. 29, 2005

(54) METHOD OF DEPOLLUTING SOIL POLLUTED BY HYDROCARBONS

(76) Inventor: Patrice Stengel, 166, Chemin de la Calade, 06140 Vence (FR)

( * ) Notice: Subject to any disclaimer, the term of this patent is extended or adjusted under 35 U.S.C. 154(b) by 0 days.

(21) Appl. No.: 10/259,008

(22) Filed: Sep. 27, 2002

(65) Prior Publication Data

US 2004/0000323 A1 Jan. 1, 2004

(51) Int. Cl.[7] .............................. B08B 3/04; B08B 3/08
(52) U.S. Cl. ............................ 134/10; 134/25.1; 134/2; 405/128
(58) Field of Search ............................ 134/2, 10, 25.1; 405/128

(56) References Cited

U.S. PATENT DOCUMENTS 5,423,340 A    6/1995  Campbell et al.
6,096,227 A  *  8/2000  Conaway ..................... 210/759
6,319,328 B1  * 11/2001  Greenberg et al. ............. 134/2

FOREIGN PATENT DOCUMENTS

| GB | 1310 108 | 3/1973 | ........... C10B/33/12 |
| GB | 2010 798 A | 12/1978 | ............ C02C/1/40 |
| JP | 09000611 | 1/1997 | ............ A61L/2/20 |
| JP | 09299924 | 11/1997 | ............ B09C/1/02 |
| WO | WO 96/30134 | 10/1996 | ............ B09C/1/02 |
| WO | WO 98/37991 | 9/1998 | ............ B09C/1/02 |

* cited by examiner

Primary Examiner—Zeinab El-Arini
(74) Attorney, Agent, or Firm—Cohen, Pontani, Lieberman & Pavane

(57) ABSTRACT

The present invention relates to a depollution treatment method for soil constituted by materials based mainly on sand and/or earth that have been contaminated with hydrocarbons, wherein said hydrocarbon-contaminated material is mixed at ambient temperature with a hydrogen peroxide solution until gas is given off and said hydrocarbons are separated by flotation.

20 Claims, 2 Drawing Sheets

US 6,872,261 B2

METHOD OF DEPOLLUTING SOIL POLLUTED BY HYDROCARBONS

FIELD OF THE INVENTION

The present invention relates to a depollution treatment method for soil contaminated with hydrocarbons. More particularly, the present invention relates to a method of treating soil constituted mainly of materials based on sand and/or earth and that have been contaminated by hydrocarbons. More particularly, the present invention provides a method of depolluting sand or earth that has been contaminated with heavy hydrocarbons coming from oil cargoes or from industrial accidents.

In the present invention, the term "materials contaminated by hydrocarbons" is used to mean solid friable soil material, mainly constituted by sand and/or earth containing mixtures of hydrocarbons of mineral and/or synthetic origin, and in particular hydrocarbons coming from crude oil or from distillates of refined crude oil. Still more particularly, the hydrocarbon comprises a mixture of hydrocarbons of mineral or synthetic origin for producing heat in combustion installations, such as the fuel oils that are said to be "heavy" in the usual terminology for petroleum products.

BACKGROUND OF THE INVENTION

Beaches are being polluted more and more frequently by hydrocarbon waste, either following accidents when transporting oil cargoes or after tankers have cleaned out their tanks at sea. Environmental constraints make it necessary after accidental pollution to clean contaminated soil as quickly and as effectively as possible. Until now, sand has merely been riddled, thus removing pollution only above a certain size. The cleaning operations performed on beaches turn out to be unsatisfactory concerning the quality of the sand once it has been cleaned.

Hydrocarbon pollution can also take place on land. Thus, there are many sites that have been polluted, either by leaks from storage tanks or from pipes for conveying oil such as pipelines, or indeed from industrial installations.

One of the solutions that has been implemented in recent years consists in allowing the hydrocarbons to degrade in contact with the sea and the sun. Another solution consists in removing the contaminated sand, and then storing it or incinerating it. Those solutions are unsatisfactory concerning requirements not to bury waste other than ultimate waste that cannot be recycled.

Other solutions have been used more recently, involving a variety of solvents or absorbents. Those solutions are difficult and expensive to implement and run the risk of solvents migrating into the environment, or else they require incineration for final treatment of the absorbents.

WO 98/37991 discloses methods implementing oxidizing chemical agents for oxidizing radicals leading to the hydrocarbons being oxidized. Nevertheless, that type of oxidation reaction needs to be implemented in an acid medium and at high temperature (70° C. to 90° C.) in a series of closed reactors, with products and reagents being circulated by pumps. In particular, the hydroxyl radicals formed by the chemical mechanism of radical oxidation are removed by dedicated installations. Those installations cannot be transported and are not easily set up on polluted sites or in the vicinity thereof, i.e. where the polluted soil for treatment is to be found. Furthermore, given the installations required and their operating conditions, treatment costs are high. Finally, the treatment is not entirely effective, with said patent stating that best results are obtained at 85° C. enabling no more than 78.6% of the hydrocarbons to be eliminated.

Patents GB 2 010 798 and EP 071 50 751 describe methods in which effluent sludge or sand contaminated by infectious germs is treated with hydrogen peroxide for bactericidal purposes in order to deodorize and/or disinfect the treated sludge or sand, given the bactericidal properties of hydrogen peroxide.

OBJECTS AND SUMMARY OF THE INVENTION

The object of the present invention is to provide a method enabling the effectiveness with which soil polluted by heavy hydrocarbons is depolluted to be improved without presenting the drawbacks of prior art methods. In particular, an object of the present invention is to be able to clear soil completely of polluting hydrocarbons.

Another object of the present invention is to recover the hydrocarbons after depollution.

Another object of the present invention is to provide a method that can be implemented using an installation suitable for being transported and set up easily on sites where polluted soil for treatment is to be found, or to the proximity of such sites.

Another object of the present invention is to provide a method that does not make use of any chemical agent that leaves traces in sand, hydrocarbons, or treatment water.

Another object of the present invention is to provide a method that complies with environmental regulations relating to industrial waste and to treating aqueous effluents.

For this purpose, the present invention provides a method of depollution treatment for soil made up of materials based mainly on sand and/or earth that have been contaminated with hydrocarbons, wherein said hydrocarbon-contaminated material is mixed, preferably at ambient temperature, with a hydrogen peroxide solution so as to cause gases to be given off and said hydrocarbons to be separated by flotation.

The term "hydrogen peroxide" is used to designate the compound of formula $H_2O_2$ in aqueous solution.

When hydrogen peroxide is mixed with the contaminated material, a foaming and/or bubbling effect is observed associated with hydrogen peroxide decomposing in application of a known disproportionation mechanism which causes oxygen to be given off ($H_2O_2 \rightarrow H_2O + \frac{1}{2}O_2$). In the present invention, it has been found that an effect of oxygen being given off within said contaminated material is to separate hydrocarbons physically from the particles of contaminated material, with the particles thus being freed of hydrocarbons due to said hydrocarbons floating to the surface.

It will be understood that the quantity and concentration of hydrogen peroxide for use in the method depend on the extent to which the material being treated is polluted.

Said soil material such as sand and/or earth may be recovered in a clean state, i.e. separated from said polluting hydrocarbons, from the bottom of the mixing receptacle, and said hydrocarbons may be eliminated by being skimmed from the surface, as explained below.

Analysis has shown that treated soil does not present any contaminating traces of the hydrogen peroxide used. Similarly, the hydrocarbons obtained after separation and depollution do not require any additional operation in order to be decontaminated from the hydrogen peroxide used. This non-contamination by hydrogen peroxide is associated with its instability and short lifetime, i.e. it decomposes very quickly in the presence of oxygen. An important advantage of the method is that it does not require any absorbent or activator to be used other than hydrogen peroxide, and it is implemented at ambient temperature.

Given the bactericidal properties of hydrogen peroxide, treatment performed in this way also has the effect of disinfecting said contaminated materials, i.e. reducing the concentration of infectious bacteria and germs. Nevertheless, because hydrogen peroxide does not leave any trace in the sand or the hydrocarbon or the water involved in the treatment, measurements have shown that sand containing infectious germs disinfected by the method can subsequently receive living microorganisms without harm and thus enable the ecosystem to become reestablished.

In an advantageous implementation, said hydrogen peroxide solution is an aqueous solution of hydrogen peroxide preferably containing 30% to 35% by volume of hydrogen peroxide.

Aqueous solutions of hydrogen peroxide containing 30% to 35% by volume of hydrogen peroxide are commercially available and they are characterized respectively by giving off 110 liters (l) to 130 l of oxygen per liter of hydrogen peroxide solution. Hydrogen peroxide solutions containing higher concentrations of hydrogen peroxide are avoided since their oxidizing power is too great and they would run the risk of damaging the installations in which the method is implemented.

In a preferred implementation, the following successive steps are performed:

1) said hydrocarbon-contaminated material is mixed with a hydrogen peroxide solution; and 2) the mixture obtained in step 1) is poured into a receptacle containing an aqueous solution so as to separate hydrocarbons by flotation, said material in the clean state settling out into the bottom of the receptacle.

Settling in an aqueous solution enables said hydrocarbons to separate out to the surface more effectively and more quickly. It is thus possible to cause flotation to take place, i.e. said hydrocarbons to rise to the surface, while using only small quantities of hydrogen peroxide.

More particularly, in step 1), said hydrocarbon-contaminated material is mixed with a hydrogen peroxide solution in a volume ratio of 5% to 25%, and preferably of 10% to 20%, of said hydrogen peroxide solution relative to the volume of said contaminated material.

More particularly, in step 2), an aqueous solution is used having a volume ratio of 50% to 100% aqueous solution relative to the volume of the mixture obtained in step 1).

In a preferred embodiment, in step 2), said mixture obtained in step 1) is allowed to settle in a receptacle containing an aqueous solution containing a small quantity of hydrogen peroxide, preferably 5% to 10% by volume of a hydrogen peroxide solution relative to the total volume of the solution, said hydrogen peroxide solution preferably containing 30% to 35% by volume of hydrogen peroxide.

This implementation is preferred since it makes it possible further to improve the effectiveness of the method by avoiding the hydrogen peroxide of said solution used in step 1) above from diluting in the settling solution. This makes it possible to limit the amount of hydrogen peroxide used in the method while nevertheless conserving a large quantity of water which is favorable for flotation.

The inventor has found that in order to obtain an effective reaction for separating the hydrocarbons, the viscosity of said contaminated materials should be such that the contaminated material is pasty but not too thick, with its dynamic viscosity preferably lying in the range 300 centistokes (cSt) to 700 cSt, and more preferably in the range 400 cSt to 500 cSt at 50° C. To do this, according to an advantageous characteristic of the method of the invention, prior to mixing step 1), a fluidizing step is performed in which said hydrocarbon-contaminated material is fluidized by crushing and/or mixing with a solvent, preferably in order to obtain a mixture presenting dynamic viscosity lying in the range approximately 300 cSt to 700 cSt and more preferably in the range 400 cSt to 500 cSt at 50° C.

More particularly, in an advantageous implementation, said step of fluidizing said hydrocarbon-contaminated material is performed by mixing with a hydrocarbon of viscosity that is lower than that of the polluting hydrocarbon contained in said contaminated material, preferably a light liquid hydrocarbon of the gasoil type.

The term "gasoil" is used herein to designate a hydrocarbon mixture derived from distilling petroleum, the mixture having a boiling point lying in the range 150° C. to 350° C. ("distillated fuel"). The use of a light hydrocarbon as a solvent presents the additional advantage of avoiding possible pollution by a polluting organic solvent.

As mentioned above, in order to enhance the disproportionation reaction, in a preferred implementation of the invention, in step 1) of mixing said contaminated material with a hydrogen peroxide solution, mixing takes place at ambient temperature in a medium that is neutral or basic, preferably having a pH greater than 9, and more preferably in the presence of a disproportionation catalyst such as iron.

The method of the invention as described below comprises more particularly the following steps in succession, in which:

1a) said material contaminated with heavy hydrocarbons is fluidized, where necessary, by being mixed, preferably by being vigorously blended with a solvent, preferably a light liquid hydrocarbon; and 1b) said optionally fluidized contaminated material obtained in step 1) is mixed with a said hydrogen peroxide solution, and the mixture of said contaminated material and said hydrogen peroxide solution possibly together with said solvent is preferably subjected to vigorous blending so as to obtain a thoroughly homogenized mixture; and 2) the mixture obtained in step 2) is allowed to settle in a tank containing water with a small quantity of hydrogen peroxide; and 3) said material when cleaned and separated from said polluting heavy hydrocarbons is recovered from the bottom of the tank and said polluting hydrocarbons are recovered from the surface by skimming; and 4) the fine particles of sediment and the water still mixed with said polluting heavy hydrocarbons skimmed from the surface in step 3) are preferably separated.

The novel method of the present invention further presents the advantage of being suitable for being implemented in an installation that is transportable and easily set up on polluted sites or in the vicinity thereof, as explained below.

Advantageously, said contaminated material is beach sand polluted with heavy hydrocarbons.

BRIEF DESCRIPTION OF THE DRAWINGS

Other characteristics and advantages of the method of the invention appear in the light of the following examples described with reference to FIGS. 1 and 2 in which.

MORE DETAILED DESCRIPTION

EXAMPLE 1

Operating Protocol

The description begins with an example of implementing an operating protocol to illustrate the respective proportions of the various reagents involved.

Natural beach sand was used that had been contaminated with a hydrocarbon of the "heavy fuel" type that has spent some time at sea before being washed ashore on the beach. The hydrocarbon content as analyzed in the laboratory gave a value of 32% by weight hydrocarbon.

0.5 l of hydrocarbon-contaminated sand was poured into a receptacle. 100 millimeters (ml) were added thereto of a commercially-available 110-volume hydrogen peroxide solution (30% by volume hydrogen peroxide) as measured on a sample. The mixture was mixed for 1 minute in a mixer. The resulting mixture was then poured into a 2-liter receptacle. Thereafter 1 liter of water and 100 ml of a commercially-available 110-volume hydrogen peroxide solution was added in the jar. The jar was closed. It was shaken vigorously for 30 seconds. After the sand had settled, the hydrocarbon phase was removed by means of a spatula. Thereafter the sand was poured into a second 2-liter jar and was washed a second time, using water. Thus, after settling, the sand was collected and dried (any appropriate means can be used).

The hydrocarbon content of the dried sand, which was less than 0.01% by weight, confirmed that the operating protocol is a highly effective method for depolluting sand contaminated with hydrocarbons. A test performed on earth polluted under the same conditions gave similar results.

If the hydrocarbons are very thick, it is necessary to begin by fluidizing them with gasoil. In the preceding example, 0.5 l of hydrocarbon-contaminated sand had added thereto 5% by volume of gasoil, i.e. 25 ml of gasoil. The mixture was blended vigorously with the hydrocarbon for several minutes so as to obtain a paste having a consistency that was easy to work.

EXAMPLE 2

Treatment Installations

Figure 1:
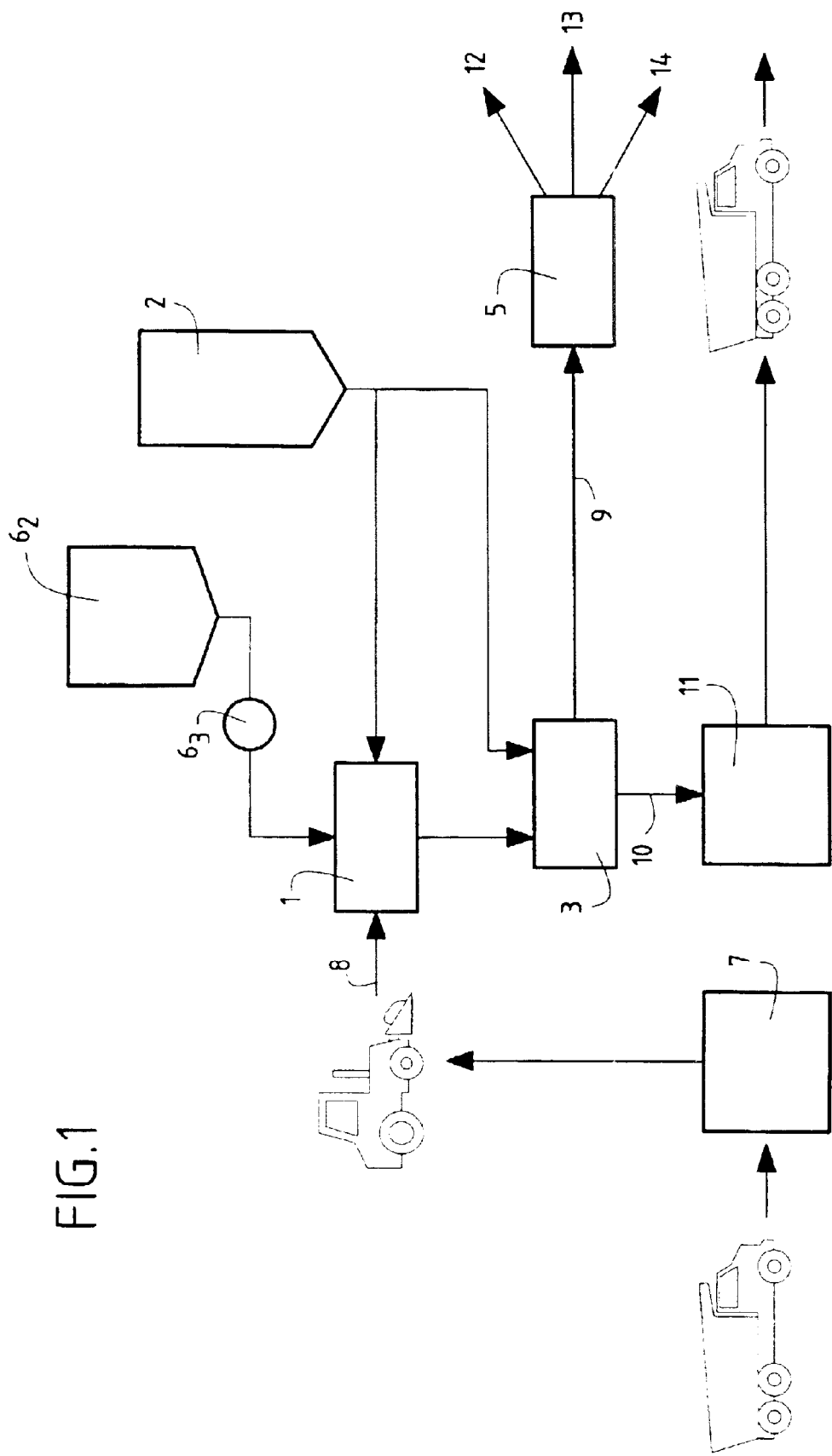
FIG. 1 shows an industrial installation for implementing the method with a step of fluidization by means of a solvent.
Figure 2:
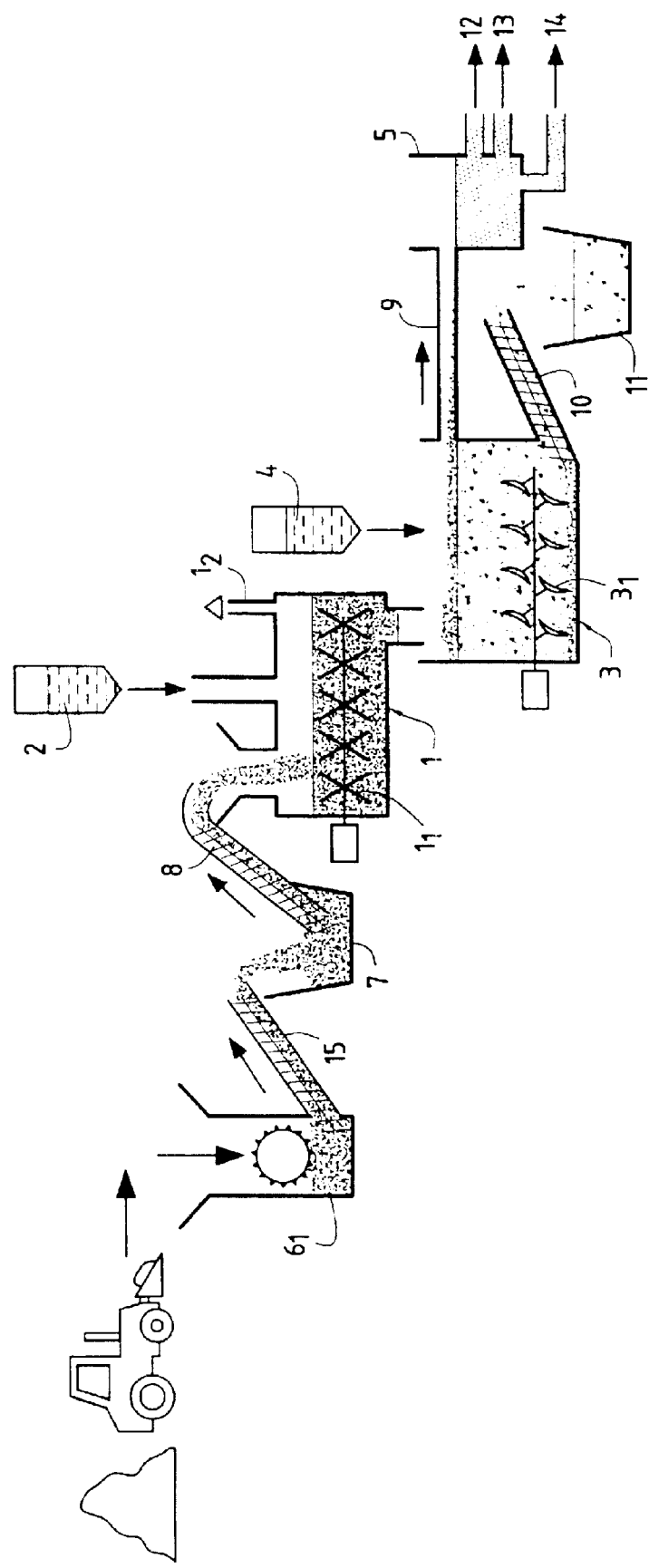
FIG. 2 shows an installation for implementing a method of the invention and including apparatus for crushing contaminated solid material, and no apparatus for fluidizing by means of a solvent.

In FIGS. 1 and 2 a transportable installation is used suitable for setting up on a polluted site or close thereto, the installation comprising from an upstream end to a downstream end:

a) a first mixer 1 comprising a closed enclosure and mixer means;

b) a storage vessel 2 for storing a said hydrogen peroxide solution for feeding said first mixer 1, and possibly also the separator settling tank 3 mentioned below;

c) a separator/settling tank 3 comprising an open vessel; and d) preferably a second storage tank 4 for storing an aqueous solution containing a small quantity of hydrogen peroxide and for feeding the separator/settling tank 3.

In FIG. 1, said installation further comprises a storage tank $6_2$ for storing said solvent and preferably a metering pump $6_3$ for feeding said first mixer with said solvent.

In FIG. 2, the installation further comprises, at its upstream end, a crusher $6_1$ for crushing the contaminated material, preferably into the form of particles having a size of less than 5 mm.

In FIGS. 1 and 2, said installation further comprises a 3-port settling tank 5 for separating polluting hydrocarbons, water, and residual fine particles of sediment coming from the surface material delivered by said separator/settling tank 3.

In addition, in FIG. 2, said installation advantageously comprises conveyor means 8 comprising an auger for conveying said contaminated material into said first mixer 1, and a second conveyor means 10 comprising an auger for conveying said contaminated material from the bottom of the separator/settling tank to an intermediate hopper 11 for storing depolluted material.

2.1 In FIG. 1 the polluted sand or earth is fed to a mixer 1 where it is mixed with a solvent.

The polluted sediment is fed, preferably by means of an auger 8, into the mixer 1 which is constituted by an enclosure 1. The sediment is preferably taken from a loading hopper 7 providing intermediate storage for polluted sediment. The enclosure is advantageous for avoiding risks of splashing associated with the concentrated hydrogen peroxide mixing that is performed. Nevertheless, the enclosure is put to atmospheric pressure by means of a vent.

Said solvent is fed into said mixer by a metering pump $6_3$ which takes it from a storage tank $6_2$, and it is then mixed with a hydrogen peroxide solution at 30% or 35% by volume stored in a storage tank 2. The resulting mixture is poured into a separator/settling tank 3 which contains water having a small quantity of hydrogen peroxide solution added thereto from the storage tank 2. The components of the mixture separate out in the separator/settling tank 3. Clean sand or earth is recovered from the bottom of the separator/settling tank 3 and is removed by means of an auger 10 that delivers it to a storage hopper 11. The surface mixture in the separator/settling tank 3 and constituted by water, hydrocarbons, and fine sediments, is skimmed 9 and delivered to a 3-port settling tank 5 which enables the three ingredients constituted by the water, the fine sediments, and the hydrocarbons to be separated out and delivered via respective ports 12, 14, and 13.

2.2 In the installation described with reference to FIG. 2, the polluted sediment is poured into a crusher $6_1$ and then conveyed by means of an auger 15 to an intermediate storage hopper 7, with the polluted sediments then being conveyed by means of a second auger 8 to a mixer 1 constituted by an enclosure in which vigorous mixing 11 is performed. The mixer 1 is fed with a highly concentrated hydrogen peroxide solution (at least 30% by volume of hydrogen peroxide) from a storage tank 2. The resulting mixture is then poured into a separator/settling tank 3 which is fed with an aqueous solution containing a small quantity of hydrogen peroxide stored in a storage tank 4. The depolluted clean sand or earth is recovered from the bottom of the separator/settling tank 3, a rotary plow share device 31 serving to drive the depolluted sediment towards an auger 10. The upward slope of the auger 10 serves to ensure that the water returns to the tank 3. At the top of the auger 10, the depolluted sediment is collected in a storage hopper 11. The hydrocarbon mixture on the surface in the tank 3 is taken (9) to a 3-port settling tank 5. The mixer 1 is constituted by an enclosure and has a vent for exhausting oxygen.

The mixer 1 is a MINOX PSM 4000® type mixer equipped as follows:

a cylindrical horizontal mixer drum;

a three-phase 380 volt 75 kW EXE3 electric motor; and drum volume: 4000 liters (working volume, approximately 70%).

The separator/settling tank 3 is constituted by a stainless steel basin having a volume of about 8 cubic meters (m$^3$), fitted with a rotating chain overflow and waste-retention device. It has a transport auger 3$_1$ with a sorting screen integrated in the basin and an auger 10 for draining the cleaned soil.

The 3-port settling tank 5 is constituted by a so-called TRICANTEUR device sold under the trademark FLOT-TWEG® comprising a cylindrical drum fitted with an auger and special separator disks, acting continuously to separate water and hydrocarbon without spoiling the nature of the hydrocarbon.

The surface material is taken from the separator/settling tank 3 to the 3-port settling tank 5 by means of a flexible auger 9.

An installation as described above occupies a ground area of about 100 square meters (m$^2$), it can be transported in two 3 m$^3$ containers and it is capable of depolluting 15 m$^3$/h to 20 m$^3$/h of polluted soil.

By way of illustration, a pilot installation as described above is suitable for treating 490 liters of polluted sediment in a said first mixer 1 having a volume of 600 liters and into which 25 liters are poured of a solution containing 30% to 35% by volume of hydrogen peroxide. Mixing is performed by vigorous blending for a period of 7 minutes (min) after which the mixture of polluted sediment and hydrogen peroxide is poured out from the first mixer 1 into a separator and settling tank 3 having a volume of 3 m$^3$. The settling tank 3 contains 300 liters of an aqueous solution obtained from 20 liters of hydrogen peroxide solution containing 30% or 35% hydrogen peroxide. These 300 liters of aqueous solution containing a small quantity of hydrogen peroxide remain reactive for a period of 6 to 8 hours without needing any topping-up in hydrogen peroxide solution. The transit time through the settling tank 3 is 10 min to 15 min.

What is claimed is:

1. A method of depollution treatment for soil comprising a material selected from the group consisting of sand, earth and combination thereof that has been contaminated with hydrocarbons, wherein said contaminated material is mixed at ambient temperature with a hydrogen peroxide solution so as to cause disproportionation of said hydrogen peroxide and the giving off of oxygen gas, said oxygen gas causing said hydrocarbons to float to the surface of the mixture of said contaminated material and said hydrogen peroxide solution, thereby said hydrocarbons are separated from said contaminated material by flotation.

2. The method according to claim 1, wherein said hydrogen peroxide solution contains about 30% to 35% by volume of hydrogen peroxide.

3. The method according to claim 1 wherein the following steps are performed in succession:

said contaminated material is mixed in a first step with said hydrogen peroxide solution; and in a second step, the mixture obtained in said first step is then poured to a receptacle containing an aqueous solution so as to separate said hydrocarbons from said contaminated material by flotation, said contaminated material seperated from said hydrocarbons settling out into the bottom of said receptacle in a clean state.

4. The method according to claim 3 wherein in said first step, said contaminated material is mixed with said hydrogen peroxide solution in volume ratio of 5% to 25% of said hydrogen peroxide solution relative to the volume of said contaminated material.

5. The method according to claim 3 wherein in said first step, said contaminated material is mixed with said hydrogen peroxide solution in a volume ratio of 10% to 20% of said hydrogen peroxide solution relative to the volume of said contaminated material.

6. The method according to claim 3 wherein in said second step, said aqueous solution contains a small quantity of hydrogen peroxide about 5% to 10% by volume of a hydrogen peroxide solution relative to the total volume of the solution.

7. The method according to claim 3, wherein prior to said first step, a fluidizing step is performed in which said contaminated material is fluidized by mixing with a solvent, in order to obtain a mixture presenting dynamic viscosity in the range approximately 300 cSt to 700 cSt at 50° C.

8. The method according to claim 7 wherein the dynamic viscosity of said mixture is in the range of 400 cSt to 500 cSt at 50° C.

9. The method according to claim 8 wherein said solvent used in said fluidizing step is a hydrocarbon with a viscosity that is lower than that of the contaminating hydrocarbon contained in said contaminated material.

10. The method according to claim 9 wherein sa solvent used in said fluidizing step is a light liquid hydrocarbon.

11. The method according to claim 1 wherein said contaminated material is mixed with said hydrogen peroxide solution at ambient temperature in a medium that is neutral or basic.

12. The method according to claim 11 wherein said medium has a pH greater than 9.

13. The method according to claim 1 wherein said contaminated material is mixed with said hydrogen peroxide solution in the presence of a disproportionation catalyst.

14. The method according to claim 1 wherein:

1a) said contaminated material is fluidized by being vigorously mixed and blended with a solvent;

1b) said fluidized contaminated material obtained in step 1a) is mixed wit said hydrogen peroxide solution, and the mixture of said contaminated material and said hydrogen peroxide solution together with said solvent is subjected to vigorous blending so as to obtain a thoroughly homogenized mixture;

2) the mixture obtained in step 1b) is allowed to settle in a tank containing water with a small quantity of hydrogen peroxide;

3) said contaminated material when cleaned and separated from said hydrocarbons are recovered from the bottom of said tank and said hydrocarbons are recovered from the surface of said tank by skimming; and 4) a remaining sediment and a remaining water still mixed with said hydrocarbons skimmed from the surface of said tank are separated.

15. The method according to claim 1, wherein a transportable installation is used suitable for being set up on a polluted site or close thereto, the installation comprising from an upstream end to a downstream end:

a) a mixer comprising an enclosure and blending means;

b) a first storage tank for storing said hydrogen peroxide solution and feeding said mixer;

c) a separator/settling tank comprising an open vessel; and d) a second storage tank for storing an aqueous solution containing a small quantity of hydrogen peroxide.

16. The method according to claim 15 wherein said installation further comprises a third storage tank for storing said solvent and a metering pump enabling said mixer to be fed with a solvent.

17. The method according to claim 15 wherein said installation further comprises a 3-port settling tank for separating said hydrocarbons, said remaining water, and said remaining sediment skimmed from the surface of said separator/settling tank.

18. The method according to claim 15 wherein said installation further comprises, at its upstream end, a crusher for crushing said contaminated material into a plurality of particles each of which has a size smaller than 5 mm.

19. The method according to claim 15 wherein said installation further comprises conveyor means comprising an auger enabling said contaminated material to be conveyed into said mixer, and second conveyor means comprising an auger enabling said contaminated material to be conveyed from the bottom of the separator/settling tank to an intermediate storage hopper for the depolluted material.

20. The method according to claim 1 wherein said contaminated material is beach sand polluted with heavy hydrocarbons.

* * * * *